(No Model.)
J. PEDDER.
COMPOUND INGOT.
No. 307,582. Patented Nov. 4, 1884.
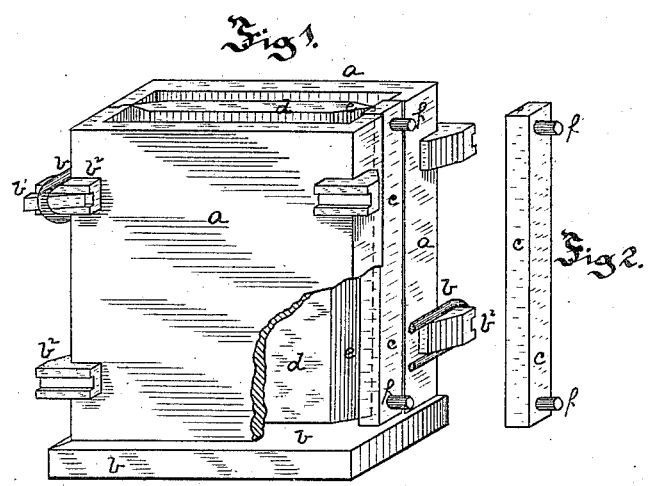
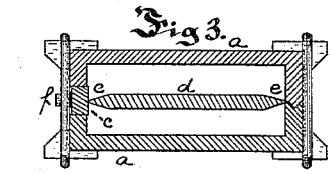
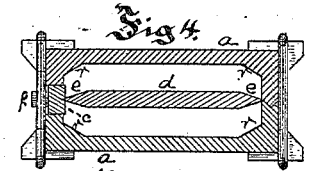
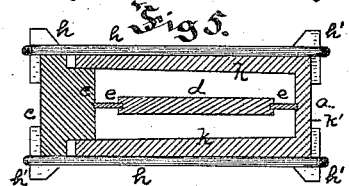
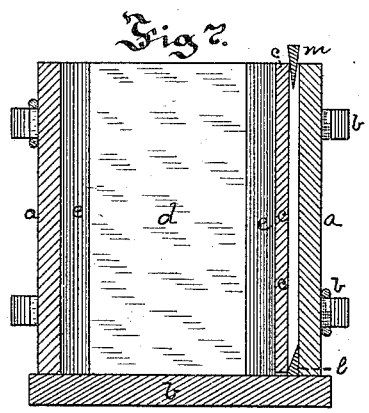
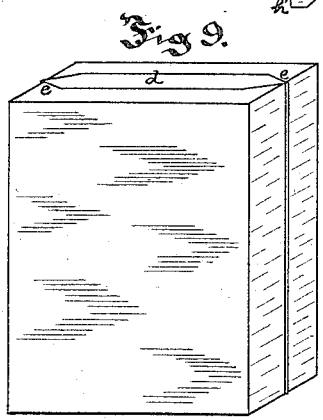
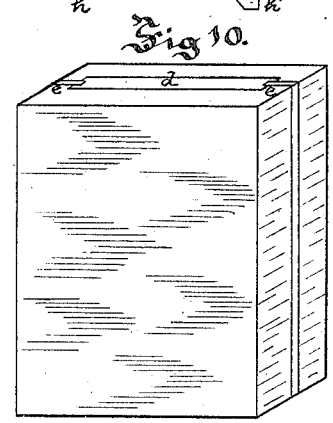
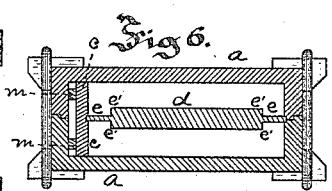
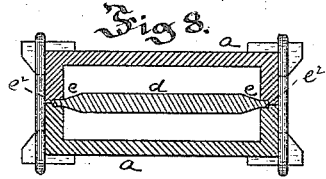
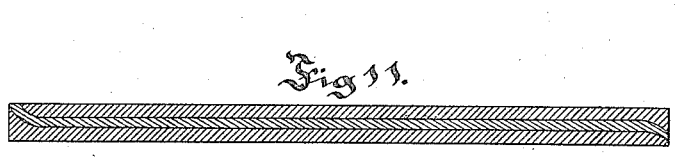
Witnesses.
J. G. Kay
J. W. Cooke
Inventor.
John Pedder
by James I. Kay
Attorney

UNITED STATES PATENT OFFICE.

JOHN PEDDER, OF PITTSBURG, PENNSYLVANIA.

COMPOUND INGOT.

SPECIFICATION forming part of Letters Patent No. 307,582, dated November 4, 1884.

Application filed February 11, 1884. (No model.)

*To all whom it may concern:*

Be it known that I, JOHN PEDDER, of Pittsburg, in the county of Allegheny and State of Pennsylvania, have invented a new and useful improvement in forming ingots and plates having layers of iron and steel or steels of different carbons; and I do hereby declare the following to be a full, clear, and exact description thereof.

My invention relates to steel ingots having layers of metal of different carbons—as, for example, iron or soft-steel center ingots or hard-steel center ingots—these ingots being employed for the manufacture of plates having layers of different carbons, and the plates being used in the manufacture of agricultural implements, where an exceedingly hard surface or edge is required for wearing, and the plate must be tough and strong to resist strokes, blows, or strain on the implement, or in the manufacture of safes, where a comparatively soft outer face is desired to resist shocks and blows, and an exceedingly hard layer is required to resist any boring or cutting in breaking into the safe. Heretofore these plates have been formed by casting the metal around a plate inserted in the mold and rolling the ingot down between flat-faced rolls, the heated ingot being passed lengthwise and sidewise between the rolls, and the metal of the outer layers being rolled over the inner layer and afterward cut off to expose the inner layer. As described in an application for patent filed December 5, 1883, Serial No. 113,572, I have improved the manufacture of these plates by casting the ingot with the plate inserted in the mold even with or extending beyond the layer or layers cast thereto, and reducing the plate by edge rolling and flat rolling, so that a plate is formed having finished uncut edges and the different layers extending out to the said edges, the edges being thus made more true and perfect, and all loss in trimming the plate to reach the inner layer being done away with. This method of forming the plates has proven a great improvement; but it is found so difficult to fit the plate neatly into the ordinary mold and prevent the steel cast from lapping around its side edges, that to prevent this the edges of the plates have been fitted into grooves in the mold, and hence in the finished ingot the thick square edges of the plate extended beyond the steel cast to it; and in edge-rolling the ingot this lip, extending beyond the body of the ingot, unless carefully fed to the rolls, was liable to be bent or lapped over sidewise, and hence the inner layer of the rolled plate was bent out of proper relative position, and there was not the same or approximately the same amount of steel on either side thereof, and it sometimes happened that the inner layer was bent over so far as to form one edge of the finished plate. This is illustrated in the sectional view of the plate, Fig. 11. It is also found desirable to have a greater proportion of steel along the cutting or wearing edges of the finished agricultural implements than in the body, as their wear was proportionately increased, and a thinner iron or soft-steel center was sufficient to support said edges, and would have the further advantage that it would not be guttered or worn out by the soil and leave the steel unsupported.

The object of my present invention is to overcome these objections in the steel ingots having layers of metal of different carbon, from which ingots the plates having these advantages may be rolled.

It consists, essentially, in an ingot formed of layers or strata of iron and steel, or of steels of different carbons, having the inner layer reduced in thickness along its side edges.

It also consists in such ingot having the inner layer extending out to the side edges of the ingot and said inner layer reduced in thickness along said side edges.

It also consists in forming the reduced side edges of the inner layer by tapering the metal from the body of the plate toward the side edges.

To enable others skilled in the art to understand my invention, I will describe the same more fully, referring to the accompanying drawings, in which—

Figure 1 is a perspective view, partly broken away, of the ingot-mold preferred by me. Fig. 2 is a like view of the block or movable portion thereof. Fig. 3 is a cross-section of the same. Figs. 4, 5, and 6 are cross-sections of other forms or constructions of molds suitable for casting my improved ingots. Fig. 7 is a vertical section of the mold shown in Fig. 6. Fig. 8 is a cross-section of a mold and center-plate, illustrating how my invention can be carried out in the ordinary mold. Figs. 9 and 10 are perspective views of my improved ingots. Fig. 11 is a cross-section of the edge-rolled plate, liable to be formed as heretofore referred to; and Figs. 12 and 13 are like views of my improved plate.

Like letters of reference indicate like parts in each.

In the drawings the mold preferred by me is shown in Figs. 1, 2, and 3, though the other molds may also be employed. The mold is preferably formed in halves $a\ a$, these halves resting on the base-plate $b$, and at one end the sides of the mold-halves are cut away for the reception of the block $c$, forming the movable or adjustable portion of the mold. The block $c$ corresponds in length to the mold-body resting on the base-plate $b$, and with the body forms the inclosing-walls of the mold. The block or portion $c$ is adjustable or movable within the sides of the mold, so that after the insertion of the plate $d$ within the mold it may be driven tight against the edges of the plate, so that if the plate is not rolled to the exact width required the portion $c$ may be adjusted against it, and the mold thus be fitted to the plate employed. The block is preferably provided with lugs $f$, to receive the blows of a hammer in driving it against the plate and forming a tight joint between them. The plate $d$ inserted in the mold, generally termed the "center-plate," is reduced or thinner along the side edges, as at $e$, than in the body, being rolled to shape, and preferably having the form shown in Figs. 1, 3, and 4, the plate gradually decreasing in thickness toward the side edges. This plate is well adapted for forming my improved ingot and plate, though shoulders $e'$ may be rolled on each face of the plate along the side edges to form the thin edges, as shown in Fig. 6; or the edges of the plate may be grooved and thin plates inserted therein, as shown in Fig. 5. These forms will be made the subjects of other applications. The plate inserted may be held to place in the mold by means of lugs on the end wall and block or movable portion $c$, or shallow grooves therein; but these are not necessary, as other guides may be employed.

The parts of the ingot-mold may be held together during casting by any suitable clamping device, that shown being a link, $b$, and key $b'$ passing over the lugs $b^2$ on the mold.

Instead of employing the block or movable part $c$, which occupies but a portion of the end wall of the mold, as shown in Figs. 1, 2, 3, the entire end $c$ of the mold may be made movable, as shown in Fig. 5, and in this case the sides $k\ k$ of the mold may be cast with the opposite end, $k'$, thereof, and the ingot be removed through the open end closed by the part $c$. In this case the movable end is clamped against the end of the center plate, $d$, by the links $h$ passing over lugs $h'$, extending out from the mold-body and the said end piece, $c$.

In Figs. 6 and 7 is shown a means of utilizing the ordinary partible mold for the purpose, the ordinary half-molds $a\ a$ being secured together in any suitable way, and a wedge piece or pieces, $l$, fitted against the base of one end wall. A plate or block, $c$, corresponding in width to the diameter of the mold-cavity, is then placed within said cavity along the end wall, against which the wedge-piece $l$ fits.

To secure the center plate in the mold, it is lowered in place, and the lower part of the block $c$ is forced against the plate by driving it down onto said wedge-piece, while the upper part of said block is forced against it by the wedges $m$. The wedge-pieces $l$ may be cast with the molds.

In forming my improved ingot the center plate having the reduced side edges in any of the forms above described is placed in the mold and secured in place by forcing the block or movable portion $c$ of the mold against its edge, thus forcing the opposite edge of the plate against the opposite end wall, so that the parts of the mold fit tightly against the plate, metal to metal, and prevent any molten metal from passing over or against its edge. This may be accomplished in any of the molds described. The molten steel of different carbon is then poured into the mold in the manner generally practiced in forming the ingots, the ingot formed having a center plate or inner layer reduced or thinner along the edges than in the body of the ingot, and yet the thin edges of the inner layer extending out to the side edges of the ingot, as the edges of the inner layer were fitted closely to the end walls of the mold, and the molten steel could not flow around them. The edges of the inner layer only extend out even with or but very slightly beyond the side edges of the ingot, being practically even therewith. The ingot may also be formed in the manner shown in Fig. 8, the inner layer being rolled with the side edges or faces, $e$, tapering or otherwise reduced in thickness, and a thin rib or edge, $e^2$, extending into recesses or grooves at the joints of the end walls of the mold. The metal is poured around this plate, forming the ingot, and after it is cooled the thin edges $e^2$ of the inner layer extending beyond the ingot, being soft, may be easily chiseled or sawed off.

To form the improved plate the ingot formed in any of these molds is brought to the proper heat and reduced to plate of the proper thickness and width by rolling, being passed through flat rolls first, and during its reduction given one or more passes edgewise to compact the edges and prevent the outer layers from being rolled over the inner layer, as fully described in said application filed December 5, 1883. As the side edges of the inner layer are practically even with the side edges of the ingot, and any extending beyond is but a thin edge, it is evident that there is no surplus metal to lap over and cover up the outer layer or to bend the inner layer out of its proper relative position. As the inner layer of the ingot is thinner along the edges than in the body, and the outer layers of hard steel are correspondingly thicker along the edges than in the body, and these relative proportions are retained in the rolled plate obtained, it is evident that a greater amount of hard metal is obtained along the edges of the finished plate, and consequently that in agricultural implements the wearing properties of the edge are proportionately increased, while the soft center is too thin to gutter or wear out and leave the steel unsupported. The plate formed from the ingot having the center plate with tapering edges is preferred by me, as the inner layer of soft metal in the finished plate tapers gradually down, and is thinnest just at the edge, the thicker metal just back of the edge making it much stronger than where the inner layer is thin for a little distance back from the edge, as shown in Fig. 13.

Where it is not desired to vary materially the thickness of the outer layers, the plate inserted is rolled with the tapering or reduced edges, and the mold shown in Fig. 4 employed, the corners $r$ of the mold-cavity being filled out correspondingly to the taper or reduction of the inner layer. When this ingot is rolled to shape, the outer layers being the same thickness, the layers of metal in the finished plate are of approximately the same thickness.

No specific claim is made in this application for the improvements shown in the molds illustrated in the drawings; nor for the specific shapes of inner layer or center plates illustrated in Figs. 5, 6, and 8; nor for the method of forming the improved plates shown; nor for agricultural steels embodying, *inter alia*, some of the improvements herein described, as these will be made the subjects of other applications.

What I claim as my invention, and desire to secure by Letters Patent, is—

1. An ingot formed of layers or strata of iron and steel, or of steels of different carbons, having an inner layer reduced in thickness along the side edges thereof, substantially as and for the purposes set forth.

2. An ingot formed of layers of iron and steel, or of steels of different carbons, having the inner layer extending out to the side edges of the ingot, and said layer reduced in thickness along said side edges, substantially as described.

3. An ingot formed of layers of iron and steel, or of steels of different carbons, having the inner layer extending to the side edges of the ingot, and said inner layer gradually decreasing in thickness toward said side edges, substantially as set forth.

In testimony whereof I, the said JOHN PEDDER, have hereunto set my hand.

JOHN PEDDER.

Witnesses:
 JAMES I. KAY,
 J. U. COOKE.